(12) United States Patent
Wallace et al.

(10) Patent No.: US 9,631,166 B1
(45) Date of Patent: Apr. 25, 2017

(54) HEATED SOAP BAR-FORMING DEVICE

(71) Applicants: Terry Wallace, Charlotte, NC (US); Cassandra Wallace, Charlotte, NC (US)

(72) Inventors: Terry Wallace, Charlotte, NC (US); Cassandra Wallace, Charlotte, NC (US)

(\*) Notice: Subject to any disclaimer, the term of this patent is extended or adjusted under 35 U.S.C. 154(b) by 329 days.

(21) Appl. No.: 14/294,459

(22) Filed: Jun. 3, 2014

(51) Int. Cl.
| | |
|---|---|
| *B29C 39/00* | (2006.01) |
| *C11D 13/16* | (2006.01) |
| *B29C 39/38* | (2006.01) |
| *B29C 39/02* | (2006.01) |
| *B29C 39/44* | (2006.01) |

(52) U.S. Cl.
CPC .............. *C11D 13/16* (2013.01); *B29C 39/02* (2013.01); *B29C 39/38* (2013.01); *B29C 39/44* (2013.01)

(58) Field of Classification Search
CPC ...................................................... C11D 13/16
See application file for complete search history.

(56) References Cited

U.S. PATENT DOCUMENTS

| | | | | |
|---|---|---|---|---|
| 2,864,932 | A | * 12/1958 | Forrer | ...................... A21B 2/00 |
| | | | | 126/21 R |
| 3,368,063 | A | * 2/1968 | Kuhn | ................. A63H 33/3055 |
| | | | | 126/19 R |
| 4,030,867 | A | 6/1977 | Everman | |
| 4,249,067 | A | * 2/1981 | Cummings | ........ A63H 33/3055 |
| | | | | 219/392 |
| 4,296,064 | A | 10/1981 | Satcher | |
| 4,917,589 | A | 4/1990 | Manderson | |
| 5,876,769 | A | 3/1999 | Dowden | |
| D411,212 | S | 6/1999 | Jones | |
| 5,968,390 | A | 10/1999 | Lister | |
| 6,459,073 | B1 | 10/2002 | Berger | |

\* cited by examiner

*Primary Examiner* — Timothy Kennedy

(57) ABSTRACT

The heated soap bar-forming device includes a housing with a storage compartment adjacent to a heating compartment. The heating compartment is responsible for melting soap remnants into a soap bar in order to re-use said soap remnants. Both the storage compartment and the heating compartment include a removable lid. The heating compartment includes a heating element that is horizontally oriented within the heating compartment. A removable soap tray is able to be placed atop of the heating element, and/or removed from the heating compartment. The heating compartment features an insulator and tray guide that ensures the removable soap tray is able to be properly seated and removed from the heating compartment. Located on the housing, and adjacent to the heating compartment is a control member that adjusts the output of heat and operation of the heating element.

3 Claims, 4 Drawing Sheets

HEATED SOAP BAR-FORMING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of soap bar-forming devices, more specifically, a device uniquely adapted to melt soap bar remnants into a single soap bar.

SUMMARY OF THE INVENTION

An embodiment of the disclosure meets the needs presented above by generally comprising a housing with a storage compartment adjacent to a heating compartment. The heating compartment is responsible for melting soap remnants into a soap bar in order to re-use said soap remnants. Both the storage compartment and the heating compartment include a removable lid. The heating compartment includes a heating element that is horizontally oriented within the heating compartment. A removable soap tray is able to be placed atop of the heating element, and/or removed from the heating compartment. The ensures the removable soap tray is able to be properly seated and removed from the heating compartment. Located on the housing, and adjacent to the heating compartment is a control member that adjusts the output of heat and operation of the heating element.

These together with additional objects, features and advantages of the heated soap bar-forming device will be readily apparent to those of ordinary skill in the art upon reading the following detailed description of presently preferred, but nonetheless illustrative, embodiments of the heated soap bar-forming device when taken in conjunction with the accompanying drawings.

In this respect, before explaining the current embodiments of the heated soap bar-forming device in detail, it is to be understood that the heated soap bar-forming device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heated soap bar-forming device.

It is therefore important that the claims be regarded as including such equivalent construction insofar as they do not depart from the spirit and scope of the heated soap bar-forming device. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
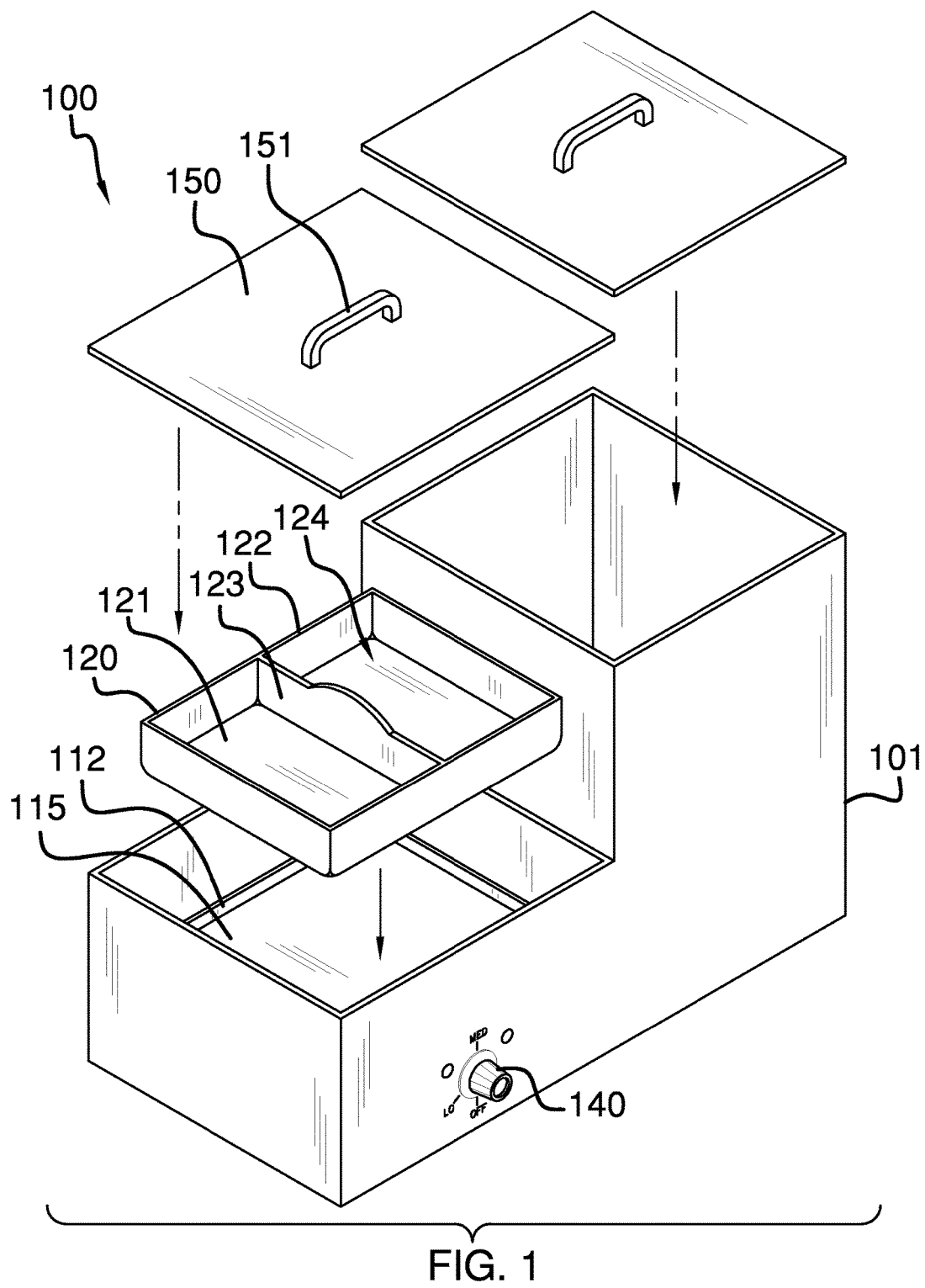
FIG. 1 is a front perspective view of the heated soap bar-forming device.
Figure 2:
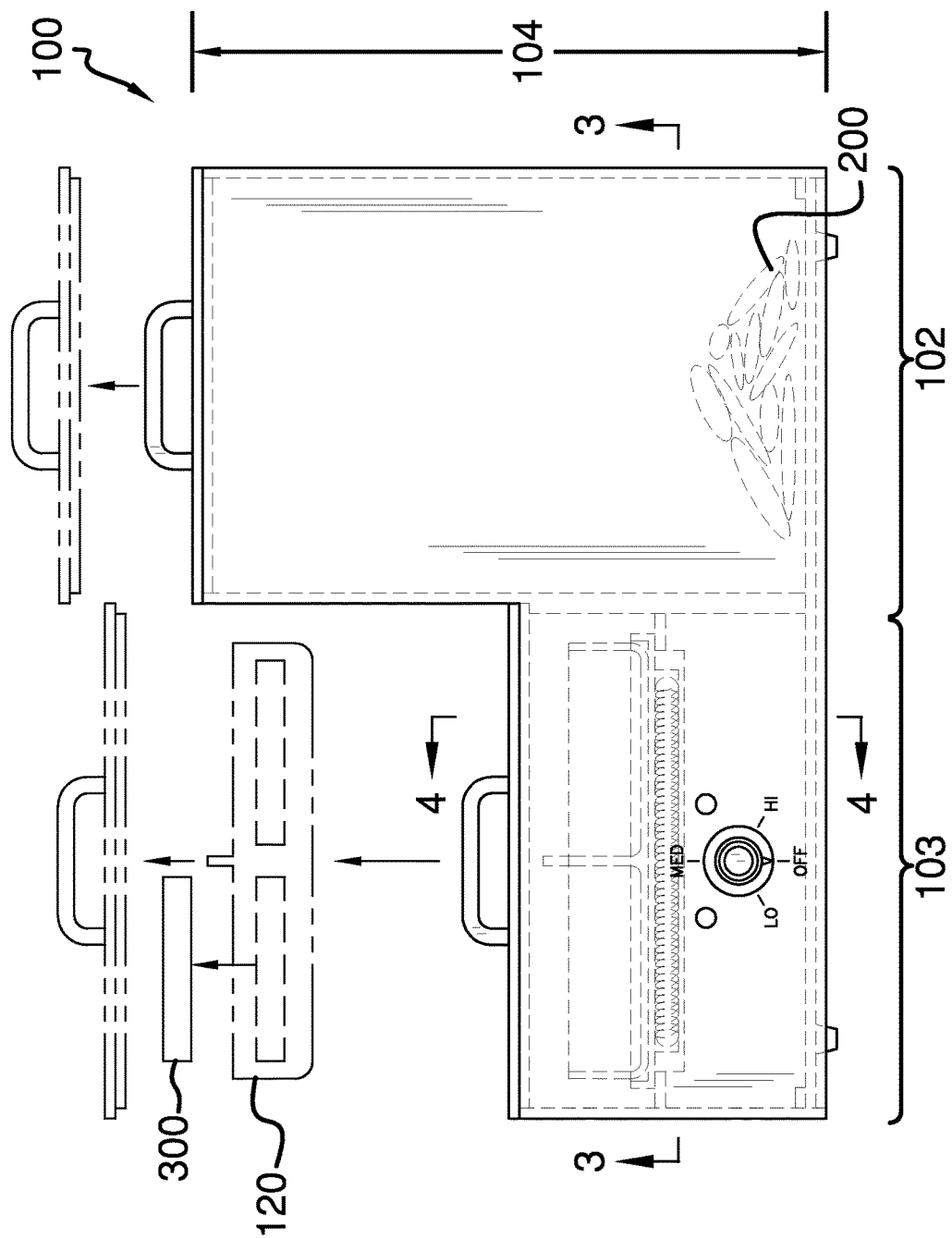
FIG. 2 is a side view of an embodiment of the disclosure.
Figure 3:
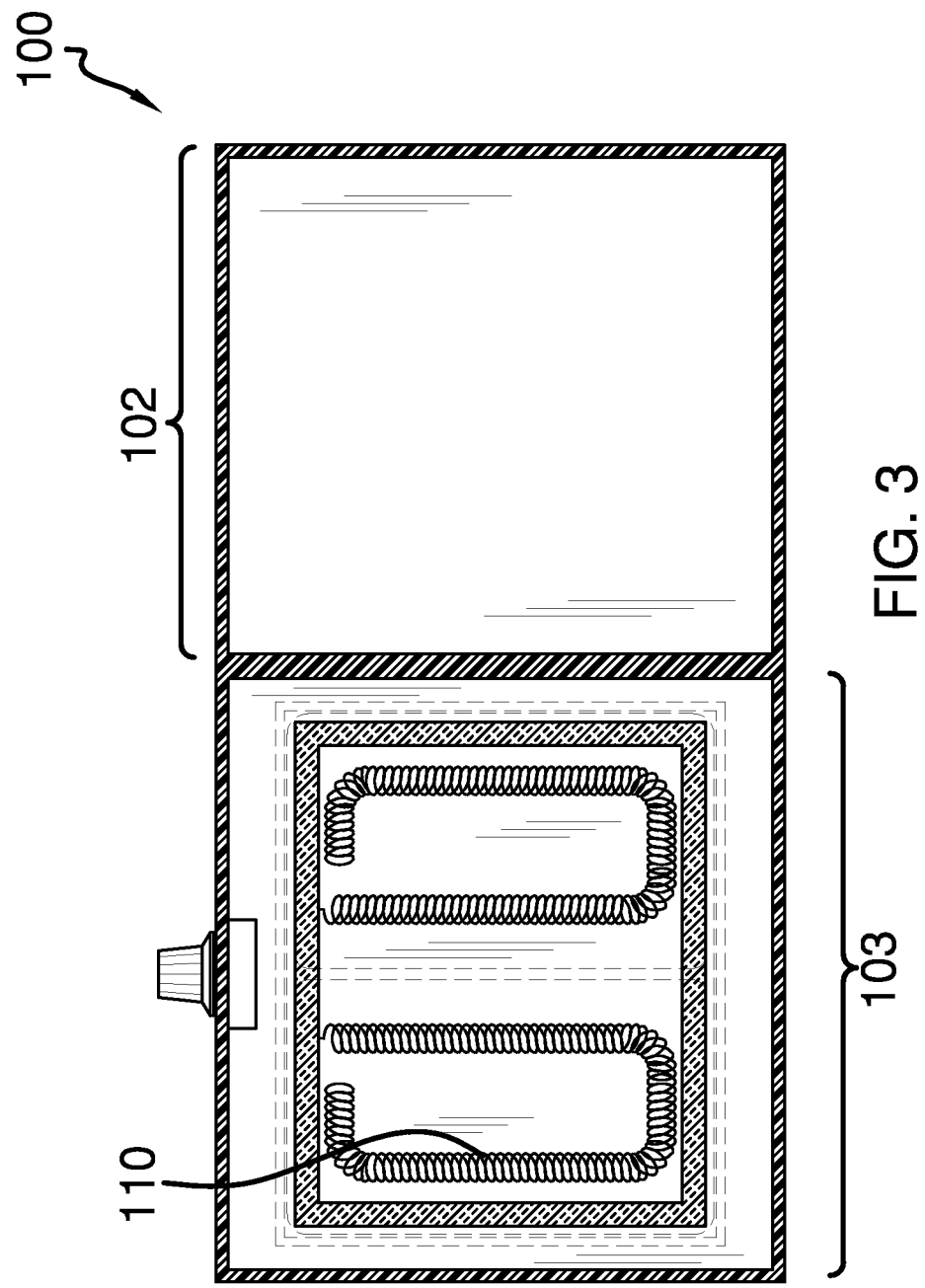
FIG. 3 is a cross-sectional view along line 3-3 in FIG. 2.
Figure 4:
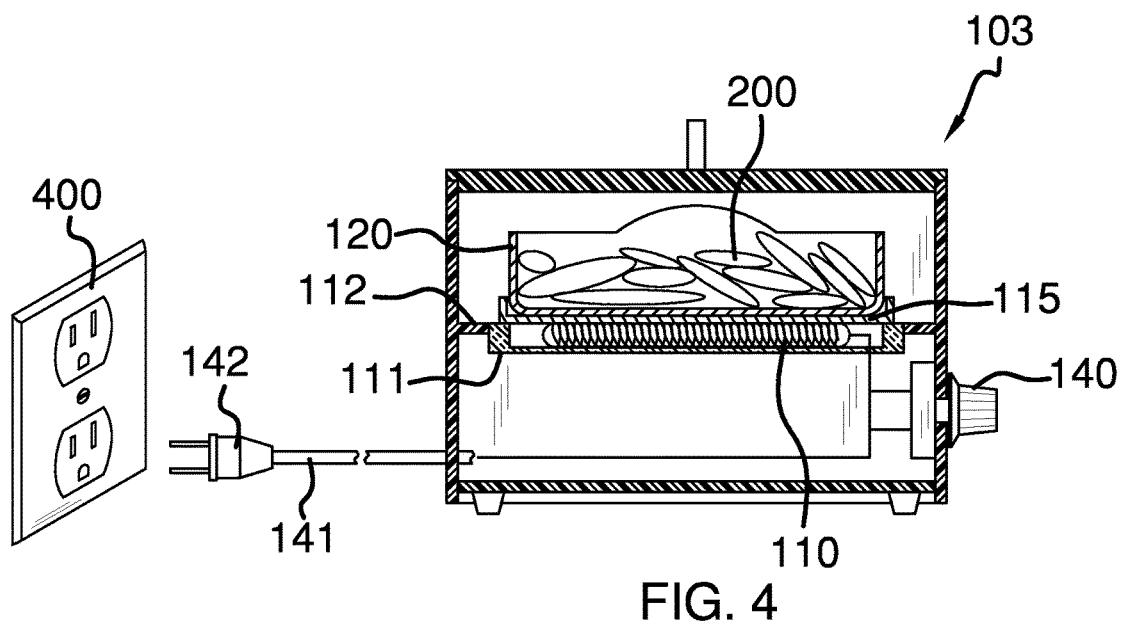
FIG. 4 is a cross-sectional view along line 4-4 in FIG. 2.
Figure 5:
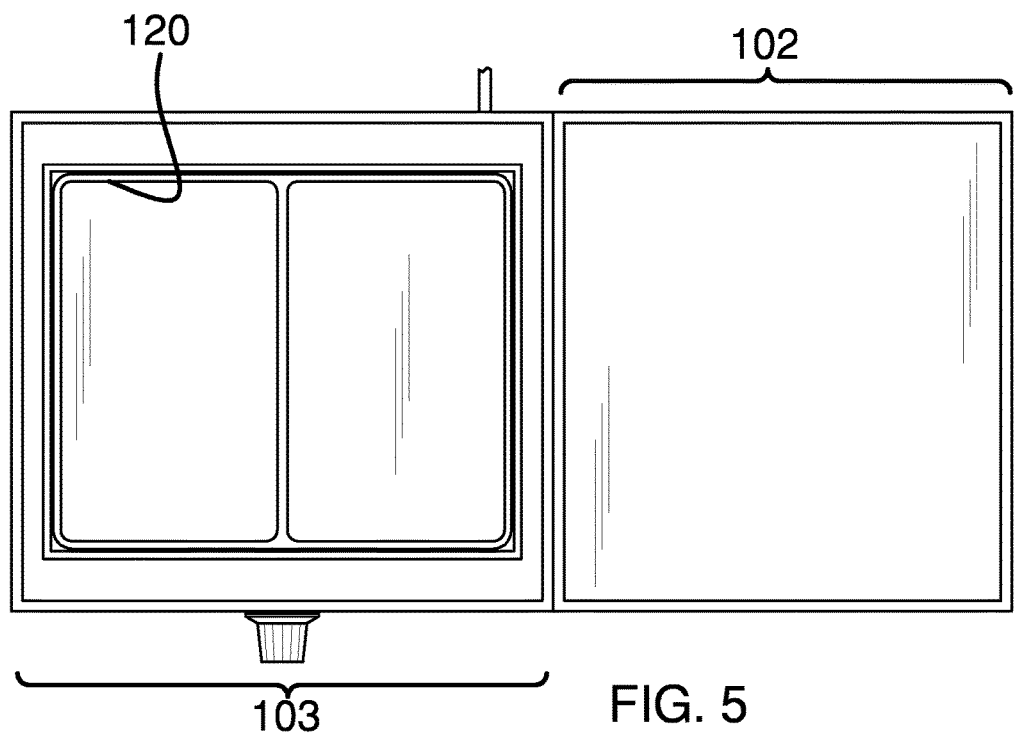
FIG. 5 is a top view of an embodiment of the disclosure.

As best illustrated in FIGS. 1 through 5, the heated soap bar-forming device 100 (hereinafter invention) generally comprises a housing 101 that includes a storage compartment 102 and a heating compartment 103. The storage compartment 102 is adjacent to the heating compartment 103. The storage compartment 102 is hollow, and includes a storage height 104. The storage compartment 102 is able to store a plurality of soap remnants 200 therein.

The heating compartment 103 includes a heating element 110 that is horizontally oriented within the heating compartment 103. Moreover, the heating compartment includes an insulating member 111 positioned underneath the heating element 110. A tray guide 112 is provided adjacent to and above the heating element 110 in order for a removable soap tray 120 to be place above the heating element 110. A heating plate 115 is positioned above the heating element 110, and interfaces between the heating element 110 and the removable soap tray 120. The removable soap tray 120 is configured to support a plurality of soap remnants 200 thereon, and subsequently form a soap bar there from, and upon exposure to heat via the heating element 110.

The removable soap tray 120 is further defined with a tray base 121, tray side walls 122, and a tray partition 123. The tray partition 123 and the tray side walls 122 define one or more bar cavities 124 that form a re-used soap bar 300 from the plurality of soap remnants 200. It shall be noted that the removable soap tray 120 is configured to produce at least one re-used soap bar 300.

The heating compartment 103 also includes a control member 140. The control member 140 is provided on the housing 101, and is responsible for controlling electrical flow to the heating element 110. Moreover, the control member 140 connects to an electrical cord 141 that is of an undefined length. The electrical cord 141 includes a male plug 142 adapted to be plugged into a standard electrical outlet 400.

Both the heating compartment 103 and the storage compartment 102 includes a removable lid 150. The removable lid 150 includes a lid handle 151. The removable lid 150 is able to enclose off the heating compartment 103 or the storage compartment 102.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A heated soap bar-forming device comprising:
  a heating compartment adjacent to a storage compartment;
  said heating compartment includes a removable soap tray that is configured to support a plurality of soap remnants thereon;
  wherein the heating compartment includes a heating element that when in use shall supply heat to the removable soap tray, which shall mold said plurality of soap remnants into a re-used soap bar;
  wherein a housing includes both the storage compartment and the heating compartment;
  wherein the storage compartment is hollow, and includes a storage height;
  wherein the storage compartment is able to store the plurality of soap remnants therein;
  wherein the heating compartment includes the heating element at a horizontal orientation within the heating compartment;
  wherein the heating compartment includes an insulating member positioned underneath the heating element;
  wherein a tray guide is provided adjacent to and above the heating element in order for the removable soap tray to be placed above the heating element;
  wherein a heating plate is positioned above the heating element, and interfaces between the heating element and the removable soap tray;
  wherein the removable soap tray is further defined with a tray base, tray side walls, and a tray partition;
  wherein the tray partition and the tray side walls define at least one bar cavity that forms the re-used soap bar from the plurality of soap remnants;
  wherein the heating compartment includes a control member; wherein the control member is provided on the housing, and is responsible for controlling electrical flow to the heating element; wherein the control member connects to an electrical cord that includes a male plug adapted to be plugged into a standard electrical outlet.

2. The heated soap bar-forming device according to claim 1 wherein both the heating compartment and the storage compartment includes a removable lid; wherein the removable lids each include a lid handle; wherein the removable lids are able to enclose off the heating compartment or the storage compartment.

3. A heated soap bar-forming device comprising:
  a heating compartment adjacent to a storage compartment;
  said heating compartment includes a removable soap tray that is configured to support a plurality of soap remnants thereon;
  wherein the heating compartment includes a heating element that when in use shall supply heat to the removable soap tray, which shall mold said plurality of soap remnants into a re-used soap bar;
  wherein a housing includes both the storage compartment and the heating compartment;
  wherein the storage compartment is hollow, and includes a storage height;
  wherein the heating compartment includes the heating element at a horizontal orientation within the heating compartment;
  wherein the heating compartment includes an insulating member positioned underneath the heating element;
  wherein a tray guide is provided adjacent to and above the heating element in order for the removable soap tray to be placed above the heating element;
  wherein a heating plate is positioned above the heating element, and interfaces between the heating element and the removable soap tray;
  wherein the removable soap tray is configured to support the plurality of soap remnants thereon;
  wherein the removable soap tray is further defined with a tray base, tray side walls, and a tray partition;
  wherein the tray partition and the tray side walls define at least one bar cavity that forms the re-used soap bar from the plurality of soap remnants;
  wherein the heating compartment includes a control member; wherein the control member is provided on the housing, and is responsible for controlling electrical flow to the heating element; wherein the control member connects to an electrical cord that includes a male plug adapted to be plugged into a standard electrical outlet;
  wherein both the heating compartment and the storage compartment includes a removable lid; wherein the removable lids each include a lid handle; wherein the removable lids are able to enclose off the heating compartment or the storage compartment.

\* \* \* \* \*